March 23, 1937. J. W. WEITZENKORN 2,074,819
APPARATUS FOR TREATING MATERIALS
Filed May 2, 1933
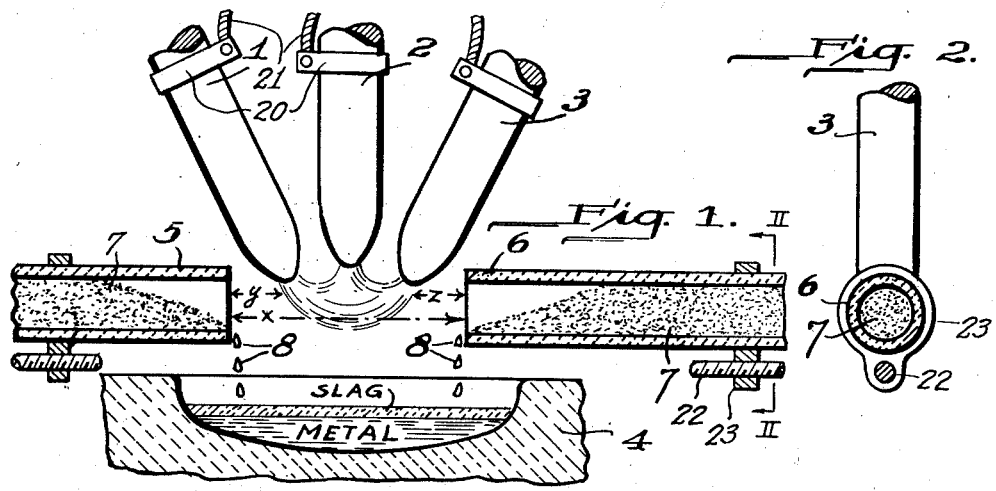
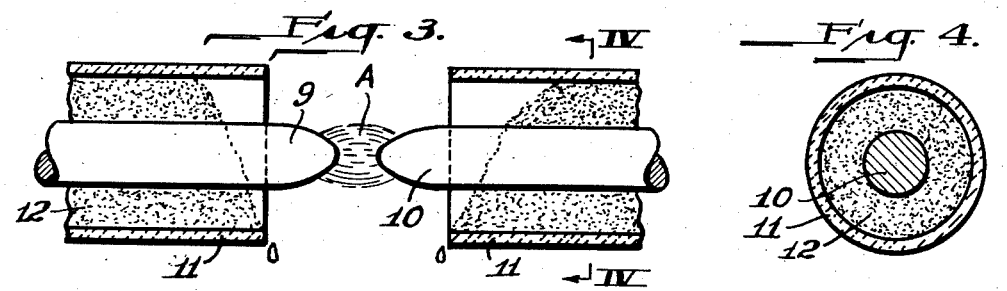
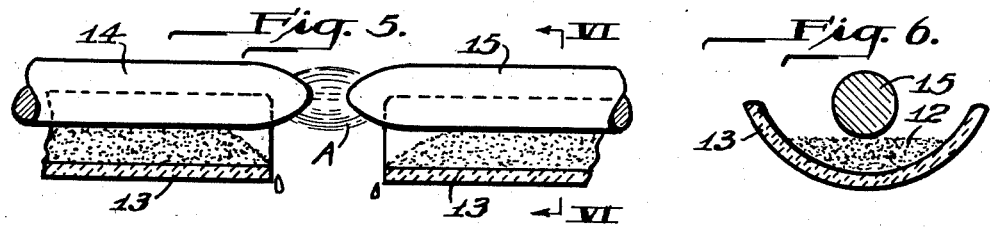
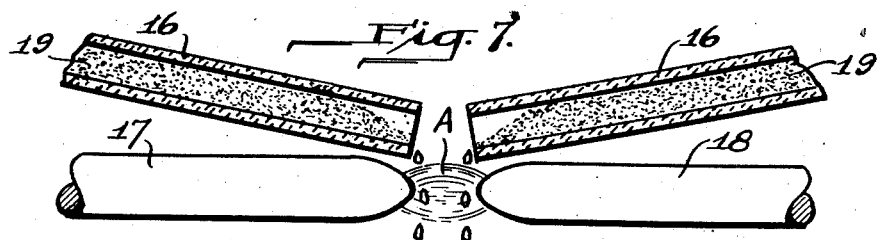
WITNESSES
INVENTOR Patented Mar. 23, 1937

2,074,819

UNITED STATES PATENT OFFICE 2,074,819

APPARATUS FOR TREATING MATERIALS

Joseph W. Weitzenkorn, Pittsburgh, Pa.

Application May 2, 1933, Serial No. 668,932

5 Claims. (Cl. 13—9)

This invention relates to the treatment of materials at elevated temperatures, particularly for carrying out reactions, and more especially to the production of metals and metallic alloys in electric furnaces.

The electric furnace is a valuable means of effecting high temperature reactions because it is useful either to control the direction in which a reaction proceeds, or to produce conditions favoring a given procedure, to cause, for example, a reaction or a change of state, for instance by converting material under treatment to the liquid or gaseous condition.

The completion of a chemical reaction is dependent in large part upon the mass of the reacting ingredients, the size of the reacting particles and their proximity to one another, the temperature, and the time of exposure to reaction temperature. Generally speaking, mass and size and proximity of particles are susceptible of satisfactory control. It is recognized that many reactions are favored by an increase in temperature, i. e., the higher the temperature the more complete the reaction in a definite time. Particularly in metallurgical procedures are high temperatures necessary or desirable, as in the production of metals and their alloys from metallic oxides and the like compounds, and the electric furnace has been found to be desirable as a source of concentrated and intense heat for such purposes.

In the usual shaft type of electric furnace only a small portion of the charge comes directly into the zone of maximum temperature, i. e., the arc zone, the average temperature throughout the reaction mass being at a considerably lower temperature. In many instances that result may be undesirable, because more satisfactory results would follow from exposure of the entire mass to maximum temperature. Also, the lower temperature prevailing in the reaction mass may necessitate exposure of such duration as to adversely affect the product or the efficiency of the process.

Hollow electrodes have been proposed for electric furnace work in an attempt to overcome the foregoing and other disadvantages. Thus, it has been proposed to feed the reaction material into the furnace through vertically disposed hollow electrodes. In such case rate of feed and rate of reaction are not readily controlled, the thought being generally that the reaction is completed substantially within the electrode prior to discharging the material through the arc zone. Such procedures are subject to disadvantages as serious as those sought to be overcome by the use of hollow electrodes. A major disadvantage arises from conditions inherent in the use of hollow electrodes. For example, electrode costs are higher than where solid electrodes are used, and necessarily so, because the hollow electrodes oxidize or are eroded more rapidly than solid electrodes. Also, the arc does not spring continuously from all points of the tip of a hollow electrode, but rather tends to move about the periphery, causing disturbances in operation, particularly under low economical power input. Moreover, the rate and quantity of feed of the reaction material is limited to the economic size of the opening in the electrode, which has a direct relation to the most economical size of electrode. For instance, if the diameter of the electrode is increased sufficiently to provide the desired large bore for feeding large amounts of material, arc efficiency in concentrating temperature in a definite area is lowered unless the power input is increased materially beyond the needs of the operation. On the other hand, if the rate of feeding through the electrode is accelerated to compensate for the limitations of power input, diameter of bore and electrode efficiency, the reaction may not be carried out to the necessary degree of completeness. With such electrodes, too, feed is largely controlled by gravity, and it is almost inescapable that all of the material be sujected to the maximum temperature, which may be undesirable. These and other features militate against hollow electrodes, both of the vertical and horizontal type.

It is among the objects of this invention to effect reactions and allied treatments of materials at elevated temperatures in a manner capable of more satisfactory control than has been possible heretofore, and a particular object is to apply the electric furnace to that end, while overcoming or minimizing the disadvantages of electric furnaces and hollow electrodes used therewith, so as to provide for simple and accurate control of operating conditions, such as temperature of reacting material and time of exposure to temperature, and thereby to improve the results and efficiency of such high temperature procedures.

The invention may be described in connection with the accompanying drawing, which represents its preferred embodiment, i. e., the electric furnace, and in which Fig. 1 is a sectional view through a portion of an electric furnace illustrating one embodiment of the invention; Fig. 2 a cross sectional view taken on line II—II, Fig. 1; Figs. 3 and 4 views similar to Figs. 1 and 2, showing another embodiment of the invention; Figs. 5 and 6 views similar to Figs. 3 and 4, showing still another embodiment; and Fig. 7 a view of a further embodiment.

The invention is predicated upon my discovery that ready and accurate control of treatments involving reactions accelerated by temperature, or involving change of state of the material, particularly high temperatures obtainable with the electric furnace, is obtained by feeding the reaction material progressively into the temperature zone through a conduit which is inclined at an angle such that the rate of feed may be controlled, preferably less than the angle of repose of the reaction material, and regulating the distance between the discharge end of the conduit and the zone of maximum thermal influence of the heat source. In this manner it is possible accurately to control various essential factors, particularly the temperature to which the reaction, or treated, material is exposed, the time of exposure to it, and the extent to which the reaction is completed before the material is discharged from the conduit. Thus it will be seen that practice of my invention avoids limitations imposed on prior practice, and hollow electrode electric furnace practice in particular, and substantially improves control of high temperature procedures.

Although the invention is applicable to substantially any source of controlled heat, particularly in a confined zone, the electric furnace provides an especially suitable source of such heat, for which reason it may be taken as the preferred embodiment in describing the invention more in detail. Most suitably the electric furnace used is of the arc or semi-arc type, although as those skilled in the art will recognize, the invention is applicable to other types of electric furnace which provide the necessary temperature. Also, for simplicity of reference the invention will be described with regard to effecting reactions, but it is to be understood as being applicable to other ends, such as to volatilization purification of metals, and procedures allied to these.

In the practice of the invention as applied to the electric furnace the material to undergo reaction or other treatment is fed into the zone of influence of the arc through one or more conduits which form no part of the electrical system of the furnace, i. e., conduits other than electrodes. Where the electrodes are vertical, or sharply inclined to the horizontal, the conduits are not associated with them, although in furnaces using horizontal electrodes the material may be fed through conduits which surround or underlie the electrode, but which do not act themselves as electrodes. As mentioned previously, the conduits preferably are disposed horizontally, although they may be inclined to the horizontal provided satisfactory control of rate of feed is obtained. The conduits may be of any suitable section, such as circular, although rectangular or other sections may be used if desirable.

Having reference now to the drawing, Fig. 1 is a schematic representation of the operative portion of a three-electrode furnace. An arc A is struck between the three electrodes 1, 2, and 3, mounted over a hearth 4. The electrodes are carried by electrode holders and connected to a source of current, in any suitable manner, e. g., being connected by ring bus members 20 bolted on the electrode and connected by cable conductors 21 to a source of current, these and other standard details of the furnace being well known to those skilled in the art and not being shown in greater detail for that reason and because they form no part of the present invention.

Projecting horizontally into the furnace over a hearth 4 is a pair of horizontal tubular conduits 5 and 6 through which reaction material 7 is progressively forced toward the heating zone created by the arc. Conduits 5 and 6 are supported in any suitable manner and they are provided with means for adjusting them toward and from the zone of heat, i. e., toward and from arc A. Such adjustment of the conduit may be effected by means of, for example, a screw 22 which engages threads in a ring member 23 tightly gripping the conduit, the screw projecting through the furnace wall for rotation without movement longitudinally of its axis, so as to move the conduit inwardly or outwardly according to need. Under the influence of the temperature of the arc the reaction is started, or started and completed, as the case may be. In the embodiment shown the products of reaction, indicated at 8, emerge from the discharge ends of the conduits and are collected on the hearth 4.

The furnace represented in Figs. 1 and 2 represents metal or alloy collected below a slag bath. To this end reaction material 7 comprises a mixture of the metallic oxide which is to be reduced and a suitable reducing agent, a fluxing agent, being added if need be. As shown in Fig. 1 the metal collects beneath the slag bath. It will be understood, however, that the invention is not limited to such reactions with such materials, but may be applied to the production of metal without the use of a slag bath, as well as to the volatilization of reaction products, such as zinc and other volatile metals. In the latter case the furnace is provided with a condensing system of any suitable type, as will be understood.

The adjustability of the feed conduits toward and from the source of heat, in this case arc A, constitutes a major feature of the invention because it provides for a wide range of operating conditions and renders operation highly flexible to adapt the furnace to different reactions, or to control of a given reaction. For example, extremely high temperatures may be injurious to the efficiency of certain reactions, or to certain products. However, by adjusting the distance between the discharge of reaction material and the zone of thermal influence, in accordance with the invention, the conditions to which the material is exposed are susceptible of more accurate control than by other means heretofore available in the art. For example, using a hollow electrode all of the reaction material, or its products, must necessarily pass through the arc zone, unless discharge slots are provided in the electrode to permit the reaction material to run out. Such a scheme is not commercially feasible, nor widely applicable, for it necessitates conversion of the materials to a molten or gaseous state, otherwise the materials may clog the slots. Also, it is not practicable to provide means for definitely controlling the temperature at the slots.

In the practice of the present invention no fixed physical state of the products of reaction is stipulated; they can be molten, as indicated in Fig. 1, semi-fused, solid or gaseous, since the temperature to which the materials are subjected can be definitely controlled through a wide range by the adjustment of the conduits toward and from the temperature zone. This with control of electrode current and voltage, either or both, permits the imposition of any desired conditions upon a reaction system.

The benefits which flow from the invention are thus realizable in providing accurate control of a reaction. It provides, as just indicated, for exposing the entire amount of material to a definite, predetermined temperature, instead of imposing an average temperature which may be too high or too low for best results. The material may be fed slowly or rapidly through a high or low temperature exposure, by adjusting the rate of feed and distance from the arc zone, while obtaining the benefit just stated.

The invention may be practiced with one or more feed conduits, as may be desired, and this affords a further major benefit. For instance, in the manufacture of some products it may be desirable to separately produce the constituents, and this may, and usually does, impose different reaction conditions. These may be obtained in the same furnace by adjusting the individual conduits as need be. For example, in feeding the same material through conduits 5 and 6 they are adjusted to a distance $x$ so that each is exposed to the same temperature. But where different materials are fed through the two conduits they are adjusted to distances $y$ and $z$ which give to each the optimum temperature.

A further benefit arises from the fact that solid electrodes are used, which affords normal electrode consumption with concomitant efficiency of furnace operation.

The means used to feed the materials through the conduits forms no part of this invention, any standard means being applicable to this end, such as a pusher located at the intake end, or a screw disposed in the conduit. Also, any furnace providing the desired temperature range and operating conditions may be used, although I prefer the arc or semi-arc furnaces for most purposes.

The invention is applicable also to other types of furnace. Having reference to Figs. 3 and 4, a furnace having two horizontal electrodes 9 and 10 is provided with tubular conduits 11 which are mounted concentrically around the electrodes for feeding reaction material 12. The discharge ends of these conduits are adjustable toward and from the arc A in a manner and for the purpose and with the benefits described hereinabove.

Likewise, it is not essential that the conduits be of the closed, or tubular type. As shown in Figs. 5 and 6, which show a horizontal electrode furnace, semi-circular conduits 13 are mounted below the electrodes 14 and 15. As in the case of Figs. 1 and 2, the conduits shown in Figs. 3 to 6 are not electrically connected to the electrodes and form no part of the electrical circuit of the furnace.

It will be understood that it is not essential that the conduits be associated with the electrodes in the manner shown in Figs. 3 to 6. For example, they may be independent of the electrodes, as in Fig. 1, in which case they may be disposed above the electrodes, as in Fig. 7, or below the electrodes, or they may project into the heating zone in a direction normal to the electrodes, or in other ways as conditions may direct.

The conduits used for feeding the material into the reaction zone may be of any suitable material, depending upon the temperatures necessary and the character of the reaction. For instance, they may be of carbon or graphite, or where that is undesirable they may be formed from refractory, and even from metal or other material for particular circumstances. Because the conduits are not a part of the electrical circuit they are not subjected to the electrode burning which characterizes the hollow electrodes heretofore proposed. Substantially the only destructive influence, provided the conduit material be selected appropriately to the reaction conditions, is the slight erosion which may occur, but this is normally not serious and is readily compensated for by the adjustability of the conduits.

Although in the apparatuses described and shown the conduits are horizontal, it is necessary only that they be disposed for controlling the rate of feed of the material. In most instances they should be disposed at an angle less than the angle of repose of the material, so that force feed is necessary and accurate control of the rate of feed is provided. In some instances, however, greater inclination is possible, as where the physical character of the material toward the discharge end impedes flow of the material. This overcomes the disadvantage of gravity feeding which necessarily accompanies the use of the previously suggested hollow vertical electrodes, in which regulated feed is not easily obtainable. This embodiment of the invention is illustrated in Fig. 7, in which a pair of conduits 16 are inclined at an angle to a pair of horizontal electrodes 17 and 18 for feeding reaction material 19 into the zone of arc A. The angle at which conduits 16 are elevated from the horizontal is selected with reference to the particular reaction material being treated, being less than the angle of repose so that the material will not flow in and of itself, although for some purposes a slightly greater angle might be used, where the natural flow of the material, due to its inclination, will provide the necessary rate of feed automatically.

Fig. 7 also illustrates a further embodiment of the invention, to wit, the feeding of the reaction material directly into and through the arc zone, which is useful in some instances. The apparatus as shown in Figs. 1 to 6, on the other hand, may be used where temperature created by the arc is needed, but where it is desired to avoid direct contact between the arc and the reaction material or reaction products.

The invention is applicable particularly to the production of metals and alloys, and especially to the production of ferrous alloys, such as the high chromium, chrome-nickel, and other types of stable surface irons and steels, as well as to the production of the ferro alloys, such as ferro-chrome, ferro-tungsten, ferro-molybdenum, and the like. But it is not limited thereto, being applicable to any reduction requiring control of temperature, speed of reaction, and the like, as well as to the refining of crude metals, and for other purposes which will be recognized by those skilled in the art. Thus, by way of example, it may be applied to the production of the alkali and alkaline earth metals, to the refining of crude zinc, etc.

The word "conduit" as used in the claims has reference not only to tubular feeding means, such as the tubular members 5 and 6, Fig. 1, but also to troughs, channels, and other forms of feeding guides, such as the trough-like members 13, Figs. 5 and 6, as will be understood by those skilled in the art.

According to the provisions of the patent statutes, I have explained the principle and mode of operation of my invention and have illustrated and described what I now consider to represent its best embodiment. However, I desire to have it understood that, within the scope of the appended claims, the invention may be practiced otherwise than as specifically illustrated and described.

I claim:

1. An apparatus for effecting a chemical reaction or otherwise treating material, comprising a source of heat, a separate conduit for progressively charging solid reaction material at an angle less than its angle of repose into the zone of thermal influence of said heat source, means associated with said conduit for adjusting the distance between its discharge outlet and said source of heat, feeding means associated with the conduit for progressively feeding said material therethrough, and means for collecting treated product discharged from said conduit.

2. In an electric furnace, an electrode from which an arc is struck, means for connecting said electrode to a source of electric current, a separate conduit for progressively charging solid material to be treated at an angle less than its angle of repose into the zone of thermal influence of said arc, means associated with said conduit for adjusting its discharge outlet toward and from said arc, and means for collecting treated product discharged from said conduit.

3. In an electric furnace, an electrode from which an arc is struck, means for connecting said electrode to a source of electric current, a separate substantially horizontal conduit for progressively charging solid material to be treated into the zone of thermal influence of said arc, means associated with said conduit for adjusting its discharge outlet toward and from said arc, and means for collecting treated product discharged from said conduit.

4. In an electric furnace, electrodes from which an arc is struck, means for connecting said electrodes to a source of electric current, a separate substantially horizontal conduit disposed exteriorly of one of said electrodes and forming therewith a passage for progressively charging solid material to be treated into the zone of thermal influence of said arc, said conduit being electrically insulated from the electrode, means associated with said conduit for adjusting its discharge outlet toward and from said arc, and means for collecting treated product discharged from said conduit.

5. In an electric furnace, electrodes from which an arc is struck, means for connecting said electrodes to a source of electric current, a plurality of separate conduits for progressively charging solid material to be treated at an angle less than its angle of repose into the zone of thermal influence of said arc, means associated with each of said conduits for independently adjusting its discharge outlet toward and from said arc, and means for collecting treated product discharged from said conduit.

JOSEPH W. WEITZENKORN.